United States Patent [19]

Skilling

[11] 4,062,916
[45] Dec. 13, 1977

[54] PRODUCTION OF TUBULAR FILM

[75] Inventor: Derek Skilling, Dumfries, Scotland

[73] Assignee: Imperial Chemical Industries Limited, London, England

[21] Appl. No.: 658,044

[22] Filed: Feb. 13, 1976

Related U.S. Application Data

[62] Division of Ser. No. 497,512, Aug. 14, 1974, Pat. No. 3,954,360.

[51] Int. Cl.² .......................................... B29D 23/04
[52] U.S. Cl. ................................... 264/95; 264/209; 264/210 R; 264/237; 264/290 R; 425/326.1; 425/532
[58] Field of Search .................. 264/89, 95, 90, 290 R, 264/210 R, 237, 209; 425/66, 71, 72 R, 326 R

[56] References Cited

U.S. PATENT DOCUMENTS

| | | | |
|---|---|---|---|
| 3,142,092 | 7/1964 | Ralston | 264/95 |
| 3,412,189 | 11/1968 | Sullivan | 264/95 |
| 3,796,781 | 3/1974 | Edwards et al. | 264/95 |
| 3,819,776 | 6/1974 | Robinson | 264/95 |
| 3,857,917 | 12/1974 | Reade | 264/95 |

FOREIGN PATENT DOCUMENTS 1,106,994   3/1968   United Kingdom .................. 264/95

Primary Examiner—Jeffery R. Thurlow
Attorney, Agent, or Firm—Cushman, Darby & Cushman

[57] ABSTRACT

Internal mandrel process and apparatus for the production of oriented tubular film in which rupture of the extruded tube by the pressure of inflating gas is prevented by means of a cup seal located between the mandrel and inflating zone, the cup seal being in peripheral engagement with the internal surface of the tube and presenting a substantially concave surface of the mandrel.

4 Claims, 9 Drawing Figures

PRODUCTION OF TUBULAR FILM

This is a division of application Ser. No. 497,512 filed Aug. 14, 1974, now U.S. Pat. No. 3,954,360.

This invention relates to the production of tubular films, and, in particular, to a method and apparatus for cooling and sizing an extruding tube of thermoplastic material by means of an internal mandrel system.

Oriented tubular film is produced by extruding a relatively thick-walled thermoplastic tube from an annular orifice, and subsequently stretching the extruded tube, at a temperature below the melting temperature and above the glass transition temperature (Tg) of the thermoplastic material, in the transverse and/or longitudinal directions to form a thin film, the stretching being effected in the transverse direction by means of internal gas pressure, and in the longitudinal direction by withdrawing the tube at an appropriate rate in the direction of extrusion. In the case of oriented films produced from crystallisable polyesters, the polyester should be in a substantially amorphous state when stretched, and the extrudate must therefore be rapidly cooled, prior to reheating and stretching, to retain the polymer in the amorphous state. Likewise, in the formation of oriented films from crystalline polymers, such as polyolefines, it is necessary to cool the extrudate to produce sufficient nuclei to ensure that individual spherulites remain small, thereby enabling the extruded tube to be readily stretched, when reheated, to yield a transparent film.

Cooling of the extruding tube is conveniently effected internally — for example, by means of a cooling and sizing mandrel located within the tube in the vicinity of the die from which the tube is extruded. If desired, additional external cooling may be effected by passing the tube through an annular cooling bath surrounding the tube in the region of the mandrel. Efficient transfer of heat from the tube to the mandrel surface may be ensured by flowing a lubricating heat-transfer fluid between the tube and that surface. By simultaneously cooling the exterior and interior surfaces of the extruding tube, increased rates of film production may be achieved.

The freshly extruded molten polymeric tube is in a relatively weak condition until it has been cooled by contact with the internal cooling mandrel, and it is therefore necessary, in the production of an oriented tubular film by the introduction of an inflating gas to within the tube, to prevent that gas passing in the upstream direction between the mandrel and tube to rupture the molten tube at or adjacent the point of extrusion. To overcome this difficulty the Complete specification of our British Pat. No. 1,284,321, the disclosure of which is incorporated herein by reference, proposes the introduction between the downstream end of the mandrel, in the direction of travel of the extruding tube, and the point at which the inflating gas is introduced, of a resilient seal in the form of a flat circular disc in peripheral engagement with the internal wall of the tube. In practice, because of the relatively rigid nature of the cooled, extruded, thick-walled tube, the peripheral edge of the disc seal tends to be deformed in the downstream direction so that the seal presents a generally convex surface towards the mandrel.

To ensure that the disc effectively seals the tube, it is desirable that a relatively high pressure of gas be maintained on the downstream side of the disc seal to urge the latter into sealing engagement with the tube wall. In practice, at high rates of extrusion, the pressure of gas employed to inflate the tube in an orienting zone downstream of the mandrel is not sufficiently reliable to support the disc seal over extended running periods, and it therefore proves necessary to introduce a secondary disc seal downstream of the first seal, and to maintain an adequate pressure of gas in the zone between the two seals to support the first disc seal in sealing engagement with the tube wall.

If a sheath of lubricating, heat-transfer liquid is maintained between the mandrel and tube, it is necessary to prevent traces of this liquid passing into the orienting zone on the internal surface of the tube. Otherwise, the resultant film will be disfigured by surface blemishes, such as "water marks". Although the disc seal(s), hereinbefore described, serve(s) to prevent the passage of most of the heat-transfer fluid to the orienting zone, it is usually necessary, in order to maintain the internal surface of the tube as dry as possible, to provide a liquid extractor, such as a sponge, downstream of the seal(s) in contact with the tube wall. If desired, suction may be applied to the liquid extractor to assist removal of liquid from the internal surface of the tube.

A further difficulty in providing adequate sealing of the tube with a disc seal of the kind hereinbefore described is that the constant abrading action between the tube surface and sealing disc leads to the accumulation and deposition between the edge of the disc and the tube surface of debris, such as polymer scrapings, catalyst residues, and antistatic agents or other additives which may be present in the extrudate, and which exhibit a tendency to volatilise at the extrusion temperatures.

We have now devised an improved and simplified sealing system.

Accordingly the present invention provides in a process for the production of an oriented tubular film of a thermoplastic polymeric material by extruding a tube of the material, withdrawing the extruded tube over a cooling and sizing mandrel located within the tube, reheating the cooled tube to its stretching temperature, introducing gas under pressure to expand the heated tube in an orienting zone, and withdrawing the expanded tube, the improvement comprising sealing the tube by means of a cup seal located between the mandrel and orienting zone, said cup seal being in peripheral engagement with the internal surface of the tube, and presenting a substantially concave surface to the mandrel.

The present invention also provides an apparatus for the production of an oriented tubular film of a thermoplastic polymeric material comprising an annular orifice for extrusion of a thermoplastic tube, a mandrel coaxial with, and of diameter less than, the extrusion orifice for cooling and sizing the tube, a distributor beyond the end of the mandrel remote from the orifice for introducing an inflating gas into the tube, and, between the mandrel and distributor, a cup seal for peripheral engagement with the internal surface of the tube, said cup seal presenting a substantially concave surface to the mandrel.

The term "cup seal" is herein employed to define a seal of substantially circular or annular configuration, in plan view, the peripheral region of the seal extending, in the upstream direction, i.e., towards the mandrel, beyond at least a part of the upstream surface of the seal.

Conveniently, a cup seal for use in the system of the present invention is in the form of a substantially flat, circular or annular, disc having a peripheral rim or lip standing proud of the upstream surface of the disc for engagement with the inner surface of the extruded thermoplastic tube. To ensure efficient sealing contact between the peripheral rim and tube, the maximum diameter of the rim desirably should be not less than that of the planar portion of the disc, and, of course, not less than the internal diameter of the extruded tube. Preferably, the rim diameter exceeds that of the planar disc. For example, the peripheral surface of the seal may be inwardly tapered in the downstream direction, so that the seal presents a frusto conical peripheral surface to the extruded tube.

In a particularly preferred embodiment of the invention the annular dimension of the uppermost extremity of the rim, i.e., the portion of the seal which first engages the extruding tube, is reduced to a minimum. In effect, therefore, the uppermost edge of the rim assumes the form of a "knife-edge" which provides efficient sealing engagement with the tube surface. However, for ease of manufacture, the uppermost extremity of the rim may be in the form of a "flat" tip having a small annular dimension for example, of the order of 0.040 inches (1.016 mm).

The cup seals of the present invention are conveniently fabricated from a resilient material which will adapt itself to accommodate minor fluctuations in the dimensions of the extruded tube so that efficient sealing engagement is maintained without damaging the tube surface. Suitable resilient materials include natural, silicone, polyurethane, and "Neoprene" rubbers.

Desirably, the cup seal is provided with reinforcing means — for example, a metal plate which may be secured to an external surface of the seal, but preferably is embedded in the resilient material during the formation of a seal therefrom. The reinforcing means should not extend into the peripheral region of the seal to the detriment of the resilient sealing characteristics thereof. Other reinforcing techniques may be employed, if desired; for example, the incorporation in the seal of conventional reinforcing agents — such as glass fibres, asbestos fibres or glass beads.

The cup seal is desirably spaced apart a constant distance from the mandrel, and this is conveniently effected by securing the cup seal to the mandrel itself, or to an extension thereof — for example by means of one or more bolts or threaded rods extending from the seal for engagement in the end of the mandrel remote from the extruder.

Introduction of inflating gas to orient the extruded tube is conveniently effected by means of a distributor conduit passing through the core of the mandrel, and it will be appreciated that the cup seal is provided with at least one orifice to accommodate this conduit, a fluid tight relationship being maintained between the cup seal and the external surface of the conduit. Additional orifices may be included in the cup seal to accommodate probes or conduits for any other purpose — for example to remove moisture from the internal surface of the tube on the downstream side of the cup seal.

A cup seal according to the invention may be employed in combination with either a dry mandrel or a lubricated mandrel. A typical dry mandrel system which is particularly suitable for the production of tubular polyester films, is described in the Complete specification of British Pat. No. 1,271,694 which relates to the production of film by melt extruding a tube of a thermoplastic material, withdrawing the tube over a cooled, matt-surfaced sizing mandrel which is of smaller diameter than the diameter of the extrusion orifice at a greater rate than the speed of extrusion of the tube, the mandrel being tapered over the length in which it is in contact with the tube to allow for the contraction of the tube as it cools to the solid state, passing the tube over a seal positioned within the tube at a point where it will not stick to the seal, heating the tube to its stretching temperature, and introducing gas under pressure to within the tube at a position beyond the seal, and finally collapsing the expanded tube.

A typical lubricated mandrel system suitable for the production of polyolefine films, and in which a cup seal of the present invention may be employed, is described in the Complete specification of British Pat. No. 1,284,321 which relates to the cooling of an extruded tube by passing an extruded tube over an internal cooling mandrel, continuously supplying a film of heat-transfer liquid to between the mandrel and the tube, maintaining, at the end of the mandrel remote from the extruder, a head of liquid capable of exerting pressure on the film of liquid, and withdrawing the liquid from the head, wherein the pressure of the liquid between the mandrel and the tube at any one point is greater than the pressure on the outside of the tube at that point. Suitably, the mandrel surface adjacent the tube is inwardly tapered in the downstream direction over at least that part of its length which is in contact with the tube.

The disclosures of the aforementioned British Pat. No. 1,271,694, and British Pat. No. 1,284,321 are incorporated herein by reference.

The cup seals of the present invention are particularly suitable for use in combination with a lubricated mandrel system of the kind described in British Pat. No. 1,284,321. Thus, as hereinabove described, when a conventional flat disc-like seal is employed beyond the downstream end of the mandrel, the peripheral edge of the seal exhibits a tendency to deform in the downstream direction, debris accumulates between the deformed edge and the extruding tube, the latter tends to be scratched by the accumulated debris, and a relatively inefficient sealing engagement is achieved between the seal and tube. However, we believe that a cup seal, as herein defined, particularly a cup seal having a "knife-edged" rim or lip, exhibits a self-cleaning action in that although debris may be removed from the inner surface of the tube by contact with the edge of the cup seal, the lubricating liquid flowing between the mandrel and tube into the space defined between the end of the mandrel and cup seal scours the area of contact between the cup seal and tube and sweeps the debris to waste through the core of the mandrel. A more effective sealing engagement is therefore readily maintained between the cup seal and tube, and the absence of accumulated debris is evidenced by a reduction in the incidence of scratches and other blemishes sustained by the inner surface of the extruded tube. A particularly desirable result of this self-cleaning action is that the period for which the film-forming equipment can be maintained in continuous operation without having to dismantle the mandrel/seal assembly, to refurbish or replace the seal, can be considerably extended by the use of a cup seal of the present invention instead of a conventional disc seal.

A further advantage exhibited by the cup seals of the present invention is that a single cup seal may be employed downstream of the mandrel in contrast to the twin seal assembly we have found necessary in the case of conventional disc seals. Elimination of one seal simplifies the mandrel seal assembly, particularly by eliminating at least one internal conduit through the mandrel core normally required to maintain a desired gas pressure between the seals of the twin assembly. That a single cup seal should suffice in this context is particularly surprising when the pressure differential across the cup seal is considered. Thus, the relatively high pressure of gas employed to inflate and orient the extruded tube might be expected to penetrate the gap between the frusto conical surface of the cup seal and tube, and to force the rim of the cup seal radially inwards out of engagement with the tube surface. Quite unexpectedly, we have observed that, in practice, this does not occur, and that, instead, an extremely effective and improved sealing engagement is achieved.

Furthermore, the efficiency of sealing is such that the amount of lubricating liquid carried to the downstream side of the cup seal on the internal surface of the extruded tube is substantially reduced, and the amount of film rejected because of surface defects such as "water spots" caused by this leakage of liquid (water) onto the film surface is substantially reduced. If desired, therefore, the liquid extractor, for example, an annular sponge located downstream of the seal in prior systems, may be dispensed with. In practice, however, we prefer to retain a liquid extractor downstream of the cup seal to ensure that the last traces of moisture are removed from the tube surface.

The cup seals of the present invention may be employed in the production of tubular films from any thermoplastic polymeric film-forming material, and particularly in the production of films and tubes from crystalline or crystallisable polymers. Suitable polymeric materials include polycarbonates, polysulphones, polyamides such as polyhexamethylene adipamide or polycaprolactam, polyesters such as polyethylene terephthalate and polyethylene-1, 2-diphenoxyethane-4, 4'-dicarboxylate, vinyl polymers and copolymers, and polymers and copolymers of 1-olefins such as ethylene, propylene, butene-1, and 4-methylpentene-1. A preferred material is a high molecular weight stereoregular predominantly crystalline polymer of propylene, either in the form of a homopolymer or copolymerised with minor quantities (e.g. up to 15% by weight of the copolymer) of other unsaturated monomers, such as ethylene. Coated films and co-extruded films may also be processed. For example, a tubular laminate formed by co-extrusion of polypropylene and polyethylene from a multi-channel annular die may be processed.

Films made according to the present invention may conveniently contain any of the additives conventionally employed in the manufacture of thermoplastic films. Thus, additives such as dyes, pigments, lubricants, anti-static agents, anti-oxidants, anti-blocking agents, surface-active agents, slip aids, gloss-improvers, prodegradants, and ultra-violet light stabilisers may be employed.

If desired, an oriented film made according to the present invention may be "heat-set", i.e., the dimensional stability of the film may be improved by heating the film, while restrained against thermal shrinkage, to a temperature above the glass transition temperature of the polymer from which the film is formed but below the melting point thereof.

The invention is illustrated by reference to the accompanying drawings in which:

FIG. 1 is a schematic elevation depicting the production of an oriented tubular polymeric film using a lubricated mandrel cooling surface in combination with a cup seal, FIG. 2 is an enlarged sectional elevation of the cup seal assembly of FIG. 1, FIG. 3 is a plan view of the cup seal along the line III-III of FIG. 2, and FIGS. 4 to 9 inclusive are schematic elevations illustrating the "concave" nature of various cup seals, only the right hand portion of each seal being illustrated.

Referring to FIG. 1, a tube of thermoplastic material 1 is shown being extruded from an annular extrusion die 2. The tube is withdrawn from the extrusion die by a pair of contra-rotating nip rolls 3 which are of width less than the collapsed tube. The rolls 3 withdraw the tube at a rate greater than that at which it is extruded, thus hauling the tube down on to a cooling mandrel 4 situated inside the tube. Water is supplied to between the tube and the mandrel by maintaining a small head of water in the space 5 at the top of the mandrel. Water is therefore carried down between the mandrel 4 and the tube 1 into the space 6 formed between the bottom of the mandrel and a resilient cup seal 7. Water is removed from this space through a pipe (not shown) which passes through the centre of the mandrel.

Below cup seal 7 is positioned a circular sponge 8 which contacts the inside of the tube 1 to remove any moisture which passes the seal. This moisture is removed from the sponge 8 by applying vacuum through a suction pipe (not shown).

As well as being cooled internally, the tube 1 is cooled externally by passage through a water bath 9 which surrounds the tube. Water is continually introduced into the water bath through pipe 10 and flows out through pipe 11. After passing through the water bath, the tube passes through a chamber 12 where vacuum is applied to the outside of the tube through pipe 13 to remove any water from the outside of the tube.

The cooled tube then passes through the pair of nip rolls 3 which control the speed at which the tube is travelling, and through banks of infra-red heaters 14 and 15 which raise the temperature of the tube to that required for stretching. The tube is then stretched in the direction transverse to its direction of extrusion by gas under pressure introduced to within the tube through distributor pipe 16, and is simultaneously stretched longitudinally by a pair of nip rolls 17 which form an air tight seal across the tube, and withdraw the tube at a rate greater than that at which it is withdrawn from the extrusion die by the nip rolls 3.

The shoulder of the inflated tube is cooled by cold gas delivered in the direction of the arrows from a cooling ring 18 located at the region where the tube attains its maximum diameter.

Referring to FIGS. 2 and 3, the cup seal 7 in the form of a flat, annular resilient disc 20 having embedded therein a steel reinforcing plate 21 is secured by bolts 22 engaging in threaded recesses 23 in the narrow end of the mandrel 4, the cup seal being spaced apart from the mandrel by cylindrical spacing members 24. Extending from the upstream surface of the cup seal is a peripheral rim 25 terminating in a knife edge 26 for sealing engagement with tube 1, so that a generally concave upstream surface 27 of the cup seal is presented to the mandrel. The maximum diameter of the rim is greater than that of the disc, so that a frusto conical peripheral surface 28 of the cup seal is presented to the inner surface of tube 1. An orifice 29 in cup seal 7 permits the passage therethrough of distributor conduit 16 through which inflating gas is supplied.

The cup seal of FIG. 4 comprises an annular disc portion 30 and an upstanding peripheral rim 31, thereby providing a generally concave upstream surface 32. In the cup seal of FIG. 5, the rim has been profiled to provide a "knife edge" 33. However, to aid self-cleaning we prefer to employ a cup seal of the kind illustrated in FIG. 6 in which the seal has been further profiled to provide a peripheral frusto conical surface 34. The included angles "α" and "β" are conveniently of the order of 143° and 112°, respectively.

Figure 1:
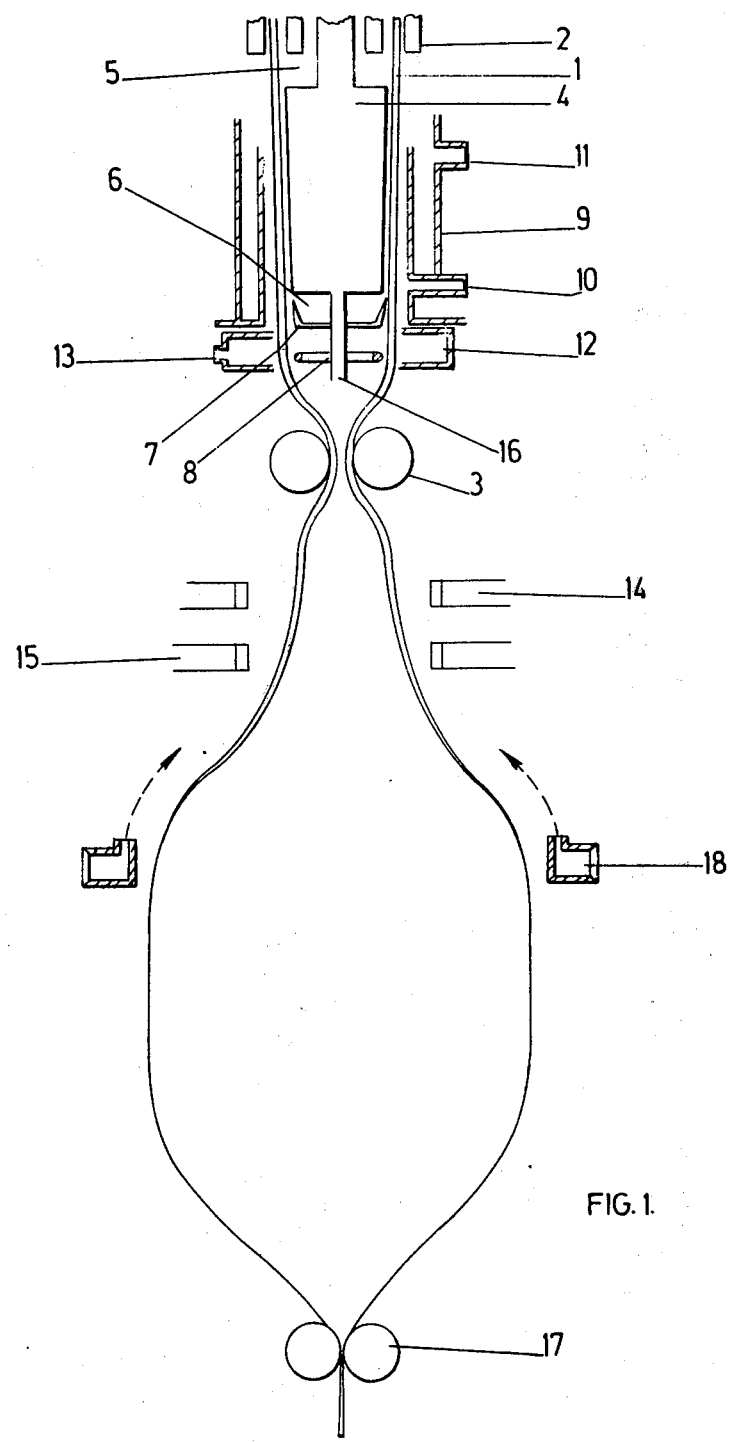
Figure 2:
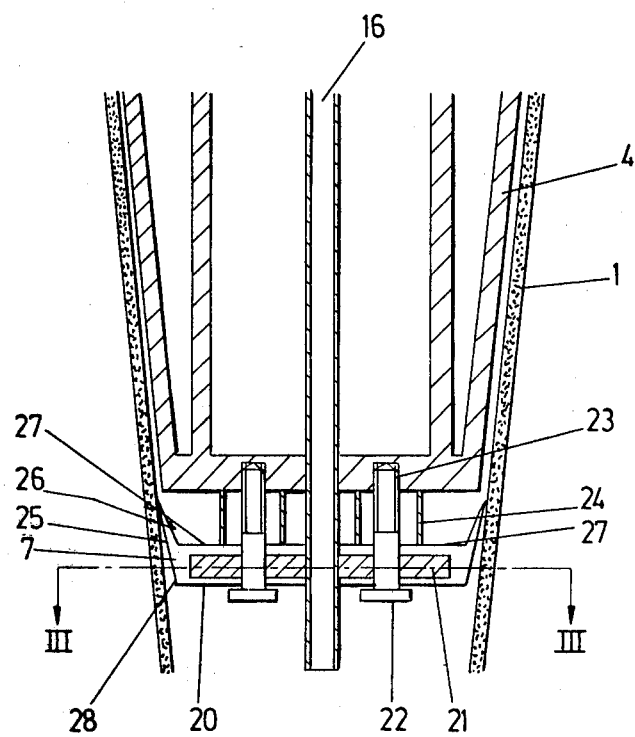
Figure 3:
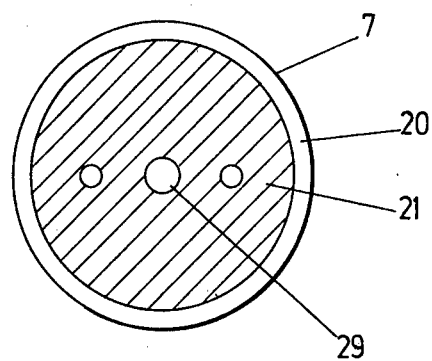
Figure 4:
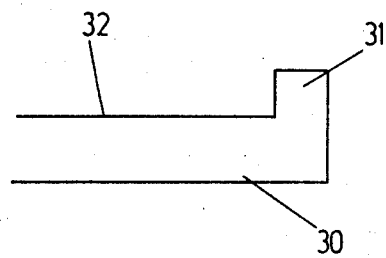

The present invention is further illustrated by the following Examples in which biaxially oriented films are produced using an apparatus of the type illustrated in FIGS. 1 and 2.

EXAMPLE 1

A propylene homopolymer was extruded at a rate of 520 lbs (230 kg) per hour through an extrusion die of diameter 6.5 inches (165 mm) with a die gap of 60 thousandths of an inch (1.52 mm). The top of the mandrel was 1 inch (25.4 mm) from the extrusion die, and the mandrel had a diameter of 6.25 inches (158.7 mm) at the top, had a matt surface, was 48 inches (1.22 meters) long and was 6.125 inches (155.6 mm) in diameter at its bottom end. Water was supplied to the gap 5 between the extrusion die and the mandrel at a rate of 30 gallons per hour (136 dm$^3$h$^{-1}$) so that a heat-transfer sheath of water was carried down between the tube and the mandrel. The mandrel itself was internally cooled by cold water.

The peripheral surface 28 of cup seal 7, which was fabricated from "Neoprene" rubber, had a maximum external diameter (at the knife edge) of 6.28 inches (159.5 mm) and was tapered over a length of about 0.5 inches (12.7 mm) to a minimum external diameter of 5.875 inches (149.2 mm).

The tube was drawn down over the mandrel by means of nip rolls 3 which collapsed the tube only at its centre and which rotated at a peripheral speed of 23 ft/minute (0.117 ms$^{-1}$). Simultaneously, the outside of the tube was cooled by the cooling bath to which cooling water was supplied through pipe 10 at a rate of 700 gallons per hour (3185 dm$^3$h$^{-1}$). The top of the water bath was 11 inches (279 mm) above the bottom end of the mandrel.

After passage through the rolls 3, the tube was heated to a temperature of about 160° C by infra-red heaters 14 and 15, and stretched in the direction of extrusion by air at a pressure of 5 inches water gauge (126 kgm$^{-2}$) introduced through pipe 16, the tube being expanded to a diameter of 45.25 inches (1149 mm). The tube was also stretched in its direction of extrusion by nip rolls 17 which withdrew the expanded tube at a speed of 195 feet per minute (0.99 ms$^{-1}$).

In operation, debris formed by contact between the tube 1 and knife edge 26 of the cup seal, were swept clear of the knife edge by entrainment in the stream of water passing downwardly between the tube and mandrel into space 6, and removed therefrom by a pipe (not shown) through the core of the mandrel. Continuous operation of the system was maintained for 24 hours and polypropylene film having acceptable haze was produced throughout this period.

EXAMPLE 2

Polypropylene film produced under identical conditions to those of Example 1, but with a twin disc seal assembly of the kind described in British Pat. No. 1,284,321 instead of the cup seal assembly of the present invention, had inferior surface characteristics, and, in the course of a continuous production run of 24 hours, a significant increase was observed in the quantity of film which had to be rejected because of surface defects caused by drops of water leaking on to the film surface on the downstream side of the seal assembly.

EXAMPLE 3

A propylene-ethylene block copolymer, containing 5% of ethylene by weight of the copolymer, was extruded at a rate of 680 lbs (300 kg) per hour through an extrusion die of diameter 6.5 inches (165 mm) with a die gap of 60 thousandths of an inch (1.52 mm). The top of the mandrel was 1 inch (25.4 mm) from the extrusion die, and the mandrel had a diameter of 6.25 inches (158.7 mm) at the top, had a matt surface, was 48 inches (1.22 meters) long and was 6.125 inches (155.6 mm) in diameter at its bottom end. Water was supplied to the gap 5 between the extrusion die and the mandrel at a rate of 40 gallons per hour (181 dm$^3$h$^{-1}$) so that a heat-transfer sheath of water was carried down between the tube and the mandrel. The mandrel itself was internally cooled by cold water.

Figure 7:
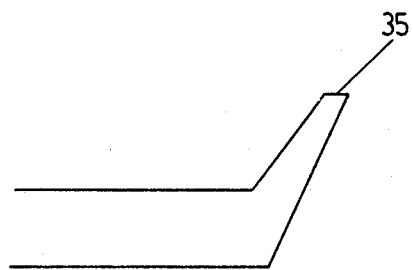
FIG. 7 illustrates a modification of the cup seal of FIG. 6, in which the uppermost extremity of the rim is in the form of a "flat" tip 35, the radial width of the "flat" being about 0.040 inches (1.016 mm).
Figure 5:
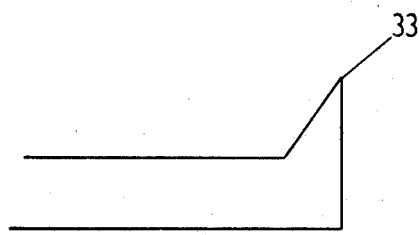
Figure 8:
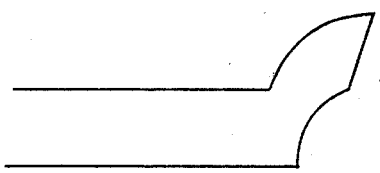
FIGS. 8 and 9 illustrate other configurations of cup seals which may be employed.
Figure 6:
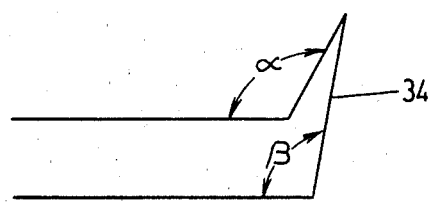
Figure 9:
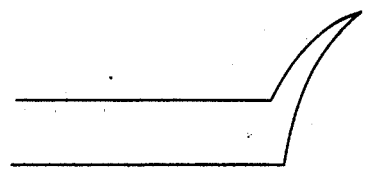

The peripheral surface 28 of cup seal 7, which was fabricated from "Neoprene" rubber, had a maximum external diameter of 6.28 inches (159.5 mm) and was tapered over a length of about 0.5 inches (12.7 mm) to a minimum external diameter of 5.875 inches (149.2 mm). The cup seal had a flat tip 35, as illustrated in FIG. 7, having a radial width of about 0.040 inches (1.016 mm).

The tube was drawn down over the mandrel by means of nip rolls 3 which collapsed the tube only at its centre and which rotated at a peripheral speed of 29.8 ft/minute (0.152 ms$^{-1}$). Simultaneously, the outside of the tube was cooled by the cooling bath to which cooling water was supplied through pipe 10 at a rate of 500 gallons per hour (2275 dm$^3$h$^{-1}$). The top of the water bath was 17 inches (432 mm) above the bottom end of the mandrel.

After passage through the rolls 3, the tube was heated to a temperature of about 160° C by infra-red heaters 14 and 15, and stretched in the direction of extrusion by air at a pressure of 6 inches water gauge (151 kgm$^{-2}$) introduced through pipe 16, the tube being expanded to a diameter of 45.25 inches (1149 mm). The tube was also stretched in its direction of extrusion by nip rolls 17 which withdrew the expanded tube at a speed of 256 feet per minute (1.3 ms$^{-1}$).

In operation, debris formed by contact between the tube 1 and flat tip 35 of the cup seal, were swept clear of the tip by entrainment in the stream of water passing downwardly between the tube and mandrel into space 6, and removed therefrom by a pipe (not shown) through the core of the mandrel. Continuous operation of the system was maintained for 11 days (264 hours) and a propylene-ethylene copolymer film exhibiting acceptable surface scratching, caused by the accumulation of debris at the seal, was still being produced at the end of this period.

EXAMPLE 4

A propylene-ethylene copolymer film produced under identical conditions to those of Example 3, but with a twin disc seal assembly of the kind decribed in British Pat. No. 1,284,321 instead of the cup seal assembly of the present invention, exhibited significant surface scratching, sufficient to cause rejection of the film because of its poor surface characteristics, by the end of a continuous production run of 5 days (120 hours) duration.

EXAMPLE 5

A similar improvement in the surface characteristics of the film, particularly a reduction in the incidence of surface scratches, is observed when the procedure of Example 3 is repeated using as the film-forming polymeric material, instead of the propylene-ethylene block copolymer containing 5% of ethylene, a propylene-ethylene block copolymer containing 10% of ethylene by weight of the copolymer.

EXAMPLE 6

Similar behaviour, i.e., a reduction in the amount of film produced having unacceptable surface characteristics, is observed when he procedure of Example 1 is repeated using, instead of the propylene homopolymer, a polyethylene terephthalate having a melt viscosity of 0.62, as measured in orthochlorophenol at 25° C, the extrusion temperature of the polyethylene terephthalate being approximately 270° C, the orienting temperature in the range 85° to 95° C, and the draw ratio in each of the longitudinal and transverse directions being approximately 3.5:1.

I claim:
1. In a process for the production of an oriented tubular film of a thermoplastic polymeric material by extruding a tube of the material from an extrusion orifice, cooling the tube to a solid state by withdrawing the extruded tube over a cooling and sizing mandrel located within the tube, reheating the cooled tube to its stretching temperature, introducing gas under pressure, from a distributor beyond the end of the mandrel remote from the extrusion orifice, to expand the heated tube, and withdrawing the expanded tube, the improvement comprising sealing the tube by means of a cup seal, between the mandrel and distributor, said cup seal being in peripheral engagement with the internal surface of the tube, and having a peripheral region extending, in an upstream direction towards the mandrel, beyond at least a part of the upstream surface of the seal, thereby presenting a substantially concave surface to the mandrel.

2. A process according to claim 1 for the production of a biaxially oriented tubular film comprising withdrawing the expanded tube at a rate greater than that at which the extruded tube is withdrawn over the mandrel.

3. A process according to claim 1 wherein the cup seal comprises a substantially flat, circular or annular disc, having a peripheral rim standing proud of the upstream surface of the disc.

4. A process according to claim 1 wherein the polymeric material is selected from a group consisting of a propylene homopolymer and a copolymer of propylene with up to 15% by weight of the copolymer of another unsaturated comonomer.

* * * * *

UNITED STATES PATENT OFFICE
CERTIFICATE OF CORRECTION

Patent No. 4,062,916  Dated Dec. 13, 1977

Inventor(s) Derek Skilling

It is certified that error appears in the above-identified patent and that said Letters Patent are hereby corrected as shown below:

In the heading of the patent add the following:

-- [30]  Foreign Application Priority Data

Sept. 17, 1973  Great Britain  43477/73 --

IN THE ABSTRACT:

Next to last line, change "of" to --to--.

IN THE SPECIFICATION:

Column 9, line 26, change "he" to --the--.

Signed and Sealed this

Thirteenth Day of June 1978

[SEAL]

Attest:

RUTH C. MASON
Attesting Officer

DONALD W. BANNER
Commissioner of Patents and Trademarks